Jan. 5, 1965
J. KASIO ETAL
3,164,192
ATTACHABLE SIDE WALL COVERING FOR TIRES
Filed Sept. 28, 1962
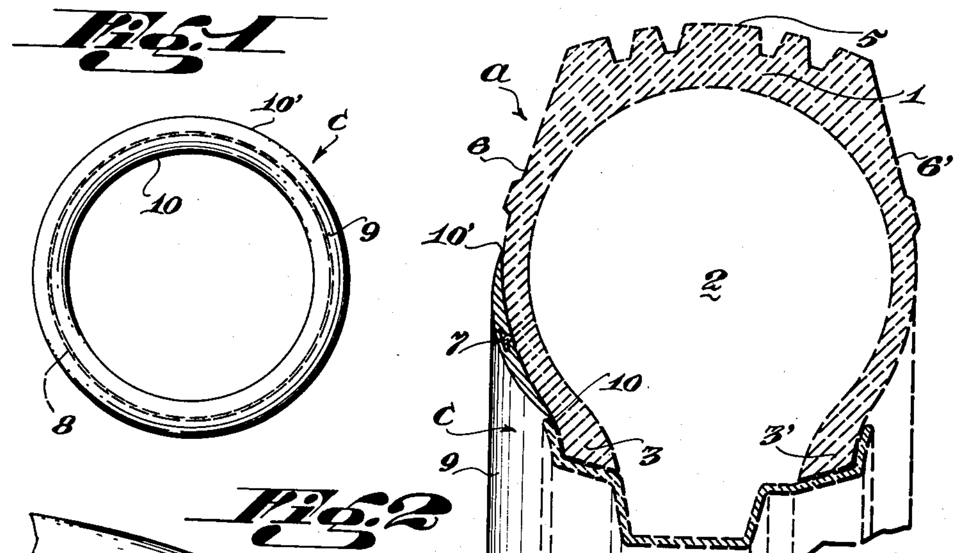
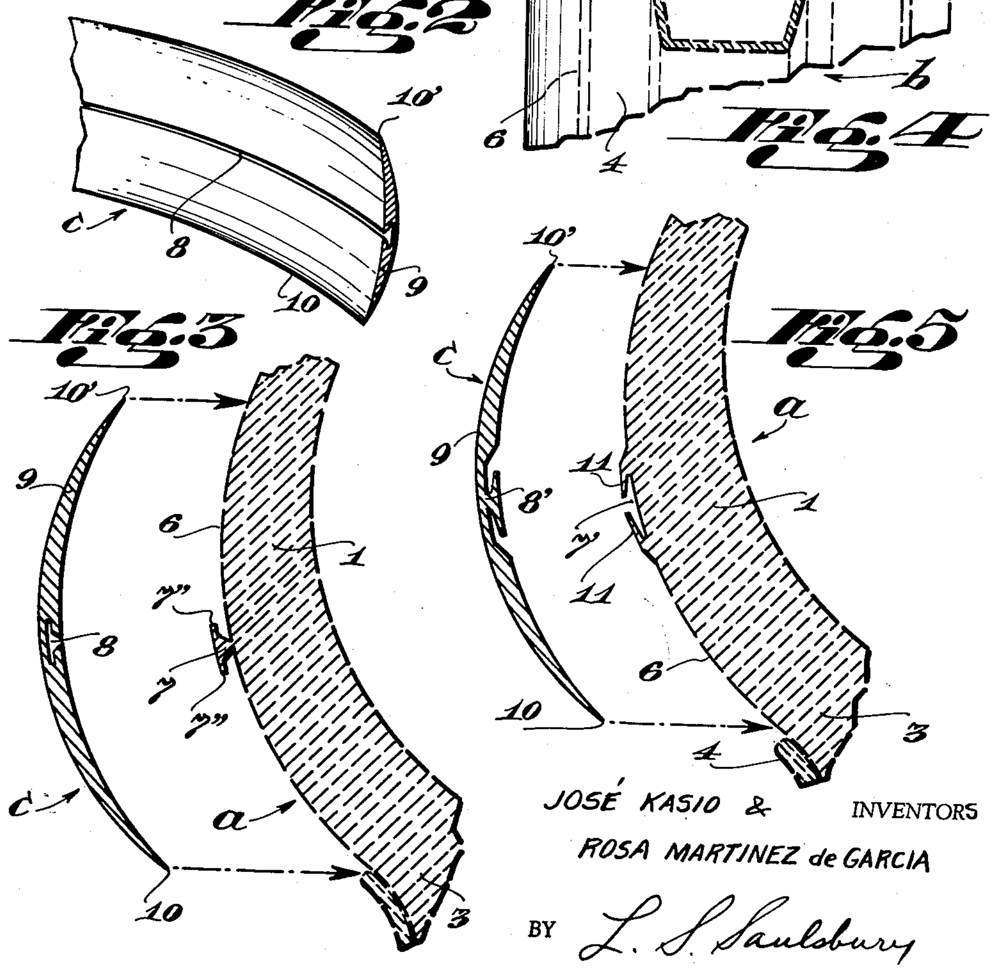
JOSÉ KASIO &
ROSA MARTINEZ de GARCIA
INVENTORS
BY L. S. Saulsbury
ATTORNEY United States Patent Office 3,164,192
Patented Jan. 5, 1965

3,164,192

ATTACHABLE SIDE WALL COVERING FOR TIRES

José Kasio, Cuenca 277P, and Rosa Martinez de Garcia, Belen 729, both of Buenos Aires, Argentina Filed Sept. 28, 1962, Ser. No. 227,022
5 Claims. (Cl. 152—353)

This invention relates to pneumatic tires for vehicles in general, and more particularly to a novel tire having means for removably securing thereto an annular sidewall covering.

The main object of the invention is to provide for the manufacture of vehicle wheel tires and for the separate manufacture of white sidewall coverings therfor, both the tire and the sidewall covering being provided with integral interfitting coupling means allowing the simple application of the said sidewall covering to the tire sidewall, whereby a tire thus complemented will have the appearance of a unit having an integral white sidewall.

As is well known, white sidewall tires are relatively expensive to manufacture as compared with ordinary tires, due to the necessity of using two types of rubber with different pigmentations corresponding to the tire body and sidewall, respectively.

For this reason, white sidewalls have been proposed which are not integral with the tire but are constructed so that they may be adapted to the sidewalls of ordinary tires, thus giving them the appearance of an integral unit.

While such detachable white sidewall coverings have met with considerable success, they generally have the drawback that the fastening thereof to the tire is obtained through an anchoring annular band and the application of such detachable sidewall coverings requires disassembling the vehicle wheel in order to fit said anchoring band between the wheel rim and the bead of the corresponding tire.

These detachable white sidewall coverings serve the double function of improving the appearance of the vehicle and of protecting the tire outer sidewalls against bumps, punctures, excessive friction (for example against curbstones) or the like. This means that damage to the detachable covering will require the occasional substitution thereof by a new one, with the disadvantage of having to disassemble the vehicle wheel to do so, as mentioned above.

The main object of the invention is to provide a pneumatic tire having a removable sidewall covering capable of being applied to or removed from said tire without having to disassemble the vehicle wheel.

For this purpose, at least one of the tire sidewalls is provided with a male or female coupling means arranged and located so as to match a complementary female or male coupling means provided on the inner face of the sidewall covering, whereby the simple interfitting of said male and female coupling means will define the face to face mounting of the covering to the tire sidewall.

A further object of the invention is to provide an annular tire sidewall covering which will be less expensive than those known heretofore, inasmuch as the body thereof is limited to the visible width on the tire to which it is applied, since the relatively thick annular portion for anchoring same between the wheel rim and the tire bead is dispensed with.

A further object of the invention is to simplify the operation of mounting or removing the sidewall covering relative to the tire, so that it will not require the aid of skilled labor or special tools.

A further object of the invention is to improve the appearance of integrality between the tire and the sidewall covering, to which end the covering is made of resilient material and is tapered from a point intermediate its width towards both the inner and outer peripheries thereof, terminating in respective sharp circular edges whereby a better adherence to the tire sidewall is obtained.

A still further object of the invention is to provide means for securing the sidewall covering in position against the tire sidewall by providing said male coupling means with retaining means which will prevent accidental unfastening of the covering during the use of the vehicle.

Other objects and advantages of the invention will become apparent in the course of the following description.

In order that the invention may be more clearly understool and readily carried into practice, some of the preferred embodiments thereof have been illustrated by way of example in the accompanying drawings, in which:

FIG. 1 is a front view of an annular detachable tire sidewall covering in accordance with the invention;

FIG. 2 is a fragmentary perspective view of the sidewall covering illustrated in FIG. 1 and showing the female coupling means formed in the inner face thereof;

FIG. 3 is a cross-sectional view of the sidewall covering, showing the manner in which it is applied to a tire sidewall (shown in a fragmentary cross-section in dash-lines);

FIG. 4 is a cross-sectional view of a pneumatic tire having a detachable sidewall covering applied to the sidewall thereof; and FIG. 5 is a sectional view of a modified embodiment of the invention, wherein the tire sidewall is formed with a female coupling means matching a male coupling means carried by the sidewall covering.

The same reference characters are used to indicate like or corresponding parts throughout the different figures.

Generally, and as shown in the drawings, *a* indicates a pneumatic tire corresponding to a vehicle wheel *b* and complemented with a detachable annular sidewall covering *c* made of resilient material such as rubber, resilient plastic or the like, and designed so as to match the design of the tire sidewall and be removably fastened thereto.

More specifically, the tire *a* comprises a body 1 shaped so as to form a chamber 2 for an inner tube and having a pair of beads 3–3' by means of which it is mounted on a wheel rim 4, as shown in FIG. 4. Said tire *a* is externally bound by faces 5, 6 and 6', of which the face 5 corresponds to the tread and the faces 6 and 6' correspond to the tire sidewalls.

The main feature of the novel tire of this invention resides in that at least one of said sidewall faces 6, 6' is provided with coupling means (male 7 or female 7') matching a further coupling means (female 8 or male 8') formed in the annular sidewall covering *c* which is adaptable to the tire sidewall 6 or 6' through the interengagement of said coupling means 7–8 or 7'–8', as the case may be.

In turn, the detachable sidewall covering *c* comprises an annular body 9 which, starting from a point intermediate the width thereof, is tapered towards the inner periphery 10 and the outer periphery 10' so as to form sharp peripheral edges, as shown in FIGS. 2, 3 and 5. This tapering of the detachable covering *c* has a double purpose, viz; it improves the appearance of integrality with the tire to which it is applied, since the sharp edges 10 and 10' thereof will practically merge with the tire body 1, and also the tapering construction of the body 9 will aid the inner concave face thereof to become better adapted to the curvature of the tire sidewall face 6 or 6' and increase the resiliency of said body 9, thereby insuring full adherence against the tire body 1 throughout the length of the edges 10 and 10'.

Thus, for example, in one of the preferred embodiments of the invention as illustrated in FIGS. 2, 3 and 4, the tire sidewall 6 has an annular projection 7 which, starting from a minimum thickness adjacent the face 6 with which it is integral, has a gradually increasing cross-sectional area, following a trapezoidal shape. The outer face of said annular projection 7 is formed with a pair of opposite lateral wing portions 7'' acting as retaining means (FIG. 3). On the other hand, the reverse or inner face of the sidewall covering *c* is formed intermediate the peripheral edges thereof with an annular groove 8 the cross-sectional area of which is similar to that of the projection 7–7'', whereby said groove 8 (which has its smaller section at the opening thereof on the surface of said covering) constitutes a female coupling means into which the male coupling means 7–7'' may be inserted with a press fit.

In any of the embodiments of the invention, the width of the tire sidewall covering *c*, i.e. the distance between the peripheral edges 10 and 10' thereof, is such that it will correspond to the predetermined visible sidewall of the tire *a*. In other words, with the coupling means 7–8 or 7'–8'' in coupled relationship, the edge 10 of the covering *c* will remain near the outer edge of the wheel rim 4, as shown in FIG. 4.

While the arrangement of the coupling means may be reversed, i.e. the female means may be provided in the tire *a* and the male means on the covering *c*, preferably the tire body 1 should have no recesses in its sidewalls in order to avoid weakening zones or affecting the tire cords. Therefore, the preferred embodiment is that shown in FIGS. 2 to 4 wherein the tire sidewall is formed with the male or projecting coupling means and covering *c* is formed with the groove or female coupling means, as clearly shown in FIGS. 2 to 4.

However, it would be possible to provide a female coupling means 7' in the tire sidewall 6 without weakening the structure thereof. Thus, in accordance with the embodiment shown in FIG. 5, the surface of said sidewall 6 may be formed with a set of facing annular wings or coupling projections 11 so as to form therebetween an annular female coupling groove 7' restricted at the opening thereof, i.e., between said wings 11, thereby retaining the similarly shaped male coupling means 8' formed on the covering *c*.

Regardless of whether the coupling means are provided with a male means on the tire and a female means in the sidewall covering or vice-versa, the annular tire sidewall covering *c* will remain perfectly fastened to the tire sidewall, as clearly shown in FIG. 4. It will also be seen that it will not be necessary to remove the tire in order to apply the covering *c*. Similarly, when it is found necessary or desirable to change the covering *c* for a new one, this may be done without removing the tire.

While we have described and illustrated the tire sidewall covering as applied to only one (the outer) sidewall, it is obvious that the tire may be provided with coupling means (either male or female) on both sidewalls and carry a covering *c* coupled to each.

It is also obvious that in carrying out the invention, many changes and/or modifications will occur to those skilled in the art, without departing from the scope of the invention as clearly set forth in the appended claims.

What we claim is:

1. A pneumatic tire for vehicles in general, which comprises on one of the sidewalls thereof an annular projecting coupling means, intermediate the beaded portion and outer tread portion thereof, arranged in matching relationship with a similarly shaped annular groove formed in the inner wall of a detachable annular sidewall covering, midway the inner and outer peripheries thereof, so that the fitting of said annular projection into said annular groove will define the fastening of said covering flatly to said tire sidewall.

2. A pneumatic tire for vehicles in general, wherein one of the sidewalls thereof is formed with a set of coupling projections, intermediate the beaded portion and outer tread portion thereof, distributed over said sidewall surface, said coupling projections corresponding in number, arrangement and shape with respective recesses formed in the inner wall of an annular detachable sidewall covering midway the inner and outer peripheries thereof, made of resilient material, whereby said annular covering may be detachably fastened flatly onto said tire sidewall.

3. A pneumatic tire for vehicles in general, wherein one of the tire sidewalls is formed with a coaxial annular projection, intermediate the beaded portion and outer tread portion thereof, which projection starting from one end adjacent to and integral with said tire, increases gradually in cross-sectional area towards the outer end thereof, said projection constituting a male coupling member and being arranged in matching relationship with an annular similarly shaped and oppositely arranged female coupling groove formed in the inner face of a detachable annular sidewall covering made of resilient material, midway the inner and outer peripheries thereof, said sidewall covering tapering from a point intermediate its width towards both the inner and the outer peripheries thereof, said tapering portions terminating in respective sharp circular edges, whereby the forced fitting of said male coupling member into said groove will cause said sidewall covering to become detachably fastened in face to face relationship to said tire sidewall.

4. A pneumatic tire for vehicles in general, wherein one of the tire sidewalls is formed, intermediate the beaded portion and outer tread portion thereof, with a coaxial annular groove restricted at the opening thereof and adapted to receive a matching coaxial annular projection formed on the inner face of a detachable annular sidewall covering, midway the inner and outer peripheries thereof, made of resilient material and tapering from a point intermediate the width thereof towards both its inner and outer peripheries, the forced engagement of said groove by said projection defining a detachable fastening of said covering to said tire sidewall.

5. In a pneumatic tire, a pair of closely spaced projecting wings on the outer surface of one of the side walls thereof midway between the beaded and tread portions thereof, said wings facing each other and defining an annular groove having a restricted opening, opening outwardly of the side wall, and a side wall covering having a concave wall correspondng in shape to the contour of said one side wall and tapering from a point intermediate its width toward both the inner and outer peripheries thereof, said tapering portions terminating in respective sharp circular edges, said concave wall having a projection on the inner surface thereof midway the inner and outer peripheries thereof, said projection, starting from one end adjacent to and integral with said inner surface, increases gradually in cross-sectional area toward the outer end thereof, said projection adapted to be received in the groove defined by said wings for detachably fastening the concave wall to said tire side wall.

References Cited in the file of this patent

UNITED STATES PATENTS

| | | |
|---|---|---|
| 1,268,258 | Manuel | June 4, 1918 |
| 2,334,388 | Daniel | Nov. 16, 1943 |
| 3,128,815 | Nonnamaker | Apr. 14, 1964 |

FOREIGN PATENTS

| | | |
|---|---|---|
| 1,061,278 | France | Nov. 25, 1953 |
| 1,079,980 | Germany | Apr. 14, 1960 |